Aug. 31, 1943.   C. W. LANGE ET AL   2,328,470
DYNAMO-ELECTRIC MACHINE COIL SUPPORT
Filed Oct. 20, 1942
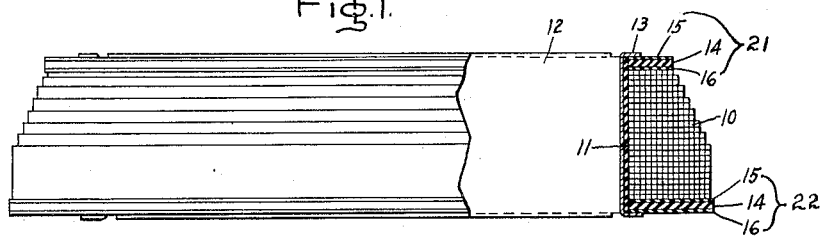
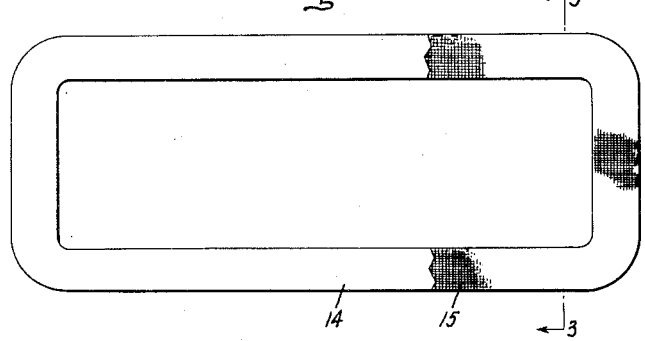
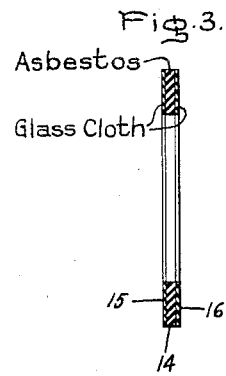
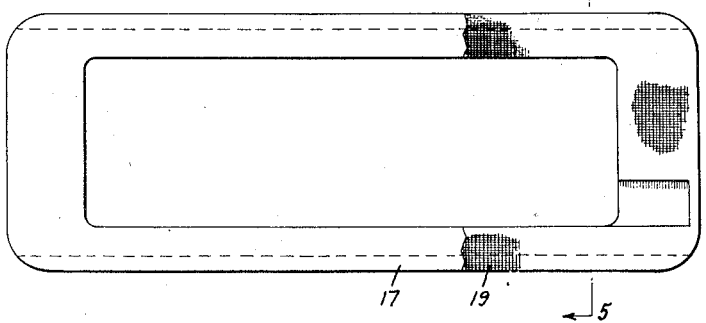
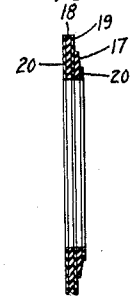
Inventors:
Carl W. Lange,
John K. Wentz,
by Harry E. Dunham
Their Attorney.

Patented Aug. 31, 1943

2,328,470

UNITED STATES PATENT OFFICE 2,328,470

DYNAMOELECTRIC MACHINE COIL SUPPORT

Carl W. Lange and John K. Wentz, Erie, Pa., assignors to General Electric Company, a corporation of New York Application October 20, 1942, Serial No. 462,702

8 Claims. (Cl. 171—252)

Our invention relates to improvements in dynamo-electric machine coil supports.

An object of our invention is to provide an improved exciting or commutating coil supporting spool.

Another object of our invention is to provide an improved exciting coil spool for a dynamoelectric machine salient pole piece.

Further objects and advantages of our invention will become apparent and our invention will be better understood from the following description referring to the accompanying drawing, and the features of novelty which characterize our invention will be pointed out with particularity in the claims annexed to and forming part of this specification.

In the drawing, Fig. 1 is a side elevational view, partly broken away, of a coil and coil support embodying our invention; Fig. 2 is a plan view, partly broken away, of the upper spool collar shown in Fig. 1; Fig. 3 is a sectional view taken along line 3—3 of Fig. 2; Fig. 4 is a plan view, partly broken away, of a modification of the lower spool collar shown in Fig. 1; and Fig. 5 is a sectional view taken along line 5—5 of Fig. 4.

Referring to the drawing, we have shown a dynamo-electric machine salient pole field exciting coil comprising insulated conductors 10 wound over the insulation 11 on the spool body and between insulating flanges. This coil is wound about and mounted on a coil supporting spool which comprises a central arbor 12 formed of suitable metal such as sheet steel and insulated over its outer surface. This arbor is provided with outwardly extending flanges 13 at each end thereof which are arranged to engage the outer substantially flat surfaces of coil supporting insulating collars 21 and 22. One of these collars is arranged at each end of the spool in order to provide the desired insulation for the coil 10 and also to provide the required support for this coil. It has been found that certain materials do not provide the desired insulation between the coil and the machine supporting frame or between the coil and the face of the pole piece when the insulation becomes heated. Asbestos provides a very good electrical insulation for a wide range of temperatures, but asbestos sheet or board does not provide the required mechanical strength for supporting an exciting coil. We have found that by arranging a sheet or layer of asbestos board 14 between layers 15 and 16 of glass fiber cloth and providing a suitable bond between the glass cloth layers 15 and 16 and the asbestos board 14 by adhesively securing the glass cloth to the outer relatively flat sides of the asbestos board by a suitable varnish, the resultant sheet provides the desired electrical insulating properties for such coil spool collars and also has the required mechanical strength for properly supporting the coil in position. In certain instances, it may be found desirable to use a plurality of layers of asbestos board as shown in the lower collar in Figs. 4 and 5. In this arrangement, two layers 17 and 18 of asbestos board are secured by a layer 19 of glass fiber cloth which is adhesively secured to adjacent sides of the two layers of board by being bonded thereto by any suitable varnish. Each of the outer substantially flat sides of the asbestos boards 17 and 18 also is bonded to a layer of glass fiber cloth 20 by any suitable adhesive, such as varnish.

In assembling a spool such as that shown in Fig. 1, the arbor 12 is formed with the flanges 13 extending outwardly at one end thereof and the flanges at the other end thereof extending axially in the same direction as the arbor 12 in order to permit the insertion of the arbor, before or after insulation 11 has been applied over the arbor, through the central openings in the spool collars 21 and 22. For windings of the kind shown in Fig. 1 the flanges 13 previously not bent are then bent outwardly to the position shown in Fig. 1 before the coil 10 is wound on the spool. The flanges 13 hold the collars 21 and 22 on the central arbor 12 and the openings through the collars provide a fit of the collars on the arbor which holds the collars in position during the winding of the coil 10. The winding of the coil is done with the central axis of the arbor 12 substantially horizontal, as in conventional coil winding practice. For certain other kinds of coils which are wound before assembling on the spool one of the collars is first assembled on the arbor 12, after which a preformed coil 10 is assembled over the arbor and then the other collar shown in Fig. 1 is placed over the arbor. When all of these have been assembled on the spool arbor 12, the previously unbent flanges 13 are bent outwardly to the position shown in Fig. 1 to retain the entire unit in assembled relationship.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. An exciting coil spool including a central insulated arbor, and means including a collar at each end of said spool for supporting said coil on said spool, said collars being formed of relatively rigid asbestos board with a layer of glass fibers bonded to the outer surfaces of said asbestos board.

2. A coil spool including a central insulated arbor, and means including a collar adjacent one end of said spool for supporting said coil on said spool, said collar being formed of relatively rigid asbestos board with a layer of glass cloth bonded to the outer surfaces of said asbestos board.

3. An exciting coil spool including a central insulated arbor, and means including a collar adjacent one end of said spool for supporting said coil on said spool, said collar being formed of relatively rigid asbestos board with a layer of glass cloth bonded within layers of said asbestos board.

4. An exciting coil spool including a central insulated arbor, and means including a collar arranged at each end of said spool for supporting said coil on said spool, said collars being formed of relatively rigid asbestos board with a layer of glass cloth bonded to the outer surfaces of said asbestos board, and one of said collars being formed of a plurality of layers of asbestos board with a layer of glass cloth bonded to adjacent surfaces of adjacent layers of said asbestos securing together said layers of board.

5. An exciting coil spool for salient pole pieces including a central insulated arbor having outwardly extending flanges, and means including a collar arranged at each end of said spool between said flanges and said exciting coil for supporting said coil on said spool, said collars being formed of relatively rigid asbestos board with a layer of glass cloth adhesively secured to the outer relatively flat surface of said asbestos board.

6. An exciting coil spool including a central insulated arbor having outwardly extending flanges, and means including a collar arranged at each end of said spool between said flanges and said exciting coil for supporting said coil on said spool, said collars being formed of relatively rigid asbestos board with a layer of glass cloth adhesively secured to the outer relatively flat surface of said asbestos board, and a layer of glass cloth adhesively secured within layers of asbestos board for one of said collars.

7. An exciting coil spool including a central arbor having outwardly extending flanges, and means including a collar arranged at each end of said spool between said flanges and said exciting coil for supporting said coil on said spool, said collars being formed of relatively rigid asbestos board with a layer of glass cloth adhesively secured to the outer relatively flat surfaces of said asbestos board, and one of said collars being formed of a plurality of layers of asbestos board with a layer of glass cloth adhesively secured to adjacent surfaces of adjacent layers of said asbestos board securing together said layers of board.

8. An exciting coil spool including a central insulated arbor, and means including a collar arranged at each end of said spool for supporting said coil on said spool, said collars being formed of relatively rigid asbestos board with a layer of glass cloth bonded to the outer surfaces of said asbestos board, and said collars being formed of a plurality of layers of asbestos board with a layer of glass cloth bonded to adjacent surfaces of adjacent layers of said asbestos board securing together said layers of board.

CARL W. LANGE.
JOHN K. WENTZ.